United States Patent [19]
Zhang et al.

[11] Patent Number: 6,163,754
[45] Date of Patent: Dec. 19, 2000

[54] COMPENSATION FOR LINE BIAS VARIATION

[75] Inventors: Qiyue John Zhang, Cupertino; John DeLucchi, Santa Cruz, both of Calif.

[73] Assignee: Trimble Navigation Limited, Sunnyvale, Calif.

[21] Appl. No.: 09/200,303

[22] Filed: Nov. 25, 1998

[51] Int. Cl.[7] .......................... G01C 21/00; G06G 7/78; G01S 5/02; H04B 7/185

[52] U.S. Cl. ................. 701/215; 342/357.06; 701/213; 701/214

[58] Field of Search .................. 701/215, 213, 701/214; 342/357.06

[56] References Cited

U.S. PATENT DOCUMENTS 6,061,631  5/2000  Zhang ..................... 701/213

Primary Examiner—Thomas H. Tarcza
Assistant Examiner—Fred H. Mull
Attorney, Agent, or Firm—John Schipper

[57] ABSTRACT

Method and apparatus for estimating a line bias for a signal received from a common signal source at each of two or more GPS signal receivers. Single difference solutions are obtained for angular orientation of an antenna array and for antenna location, using a two-thread or two-procedure process for determining and updating line bias variation within each of a sequence of time intervals.

12 Claims, 6 Drawing Sheets

COMPENSATION FOR LINE BIAS VARIATION

FIELD OF THE INVENTION

This invention relates to compensation in a multi-antenna system for line biases that can change with time.

BACKGROUND OF THE INVENTION

Signals are sometimes received at two or more signal receivers and are subtracted to form a single difference signal in which common errors are canceled. One problem with this approach is that the processing paths for the two or more signals may not be identical and may introduce additional, unintended differences into the signals as processed. With reference to FIG. 1, consider a signal s(t) transmitted by a single signal source 11 that is received by each of two signal antennas, 13A1 and 13A2, where the two received signals, $s_{A1,a}(t)$ and $s_{A2,a}(t)$ are pre-processed and transported by the transport paths, 15A1 (P1) and 15A2 (P2), to input terminals of respective signal receivers, 17A1 and 17A2, which are optionally parts of a single processor 19. After initial processing (amplification, smoothing, frequency downconversion, etc.), the respective signals, $s_{A1,ro}(t)$ and $s_{A2,ro}(t)$, produced at the output terminals of the two receivers, 17A1 and 17A2, are formed into a single difference signal $s_{SD,ro}(t;A1;A2)=s_{A1,ro}(t)-s_{A2,ro}(t)$, in which common errors in the two receiver output signals, $s_{A1,ro}(t)$ and $s_{A2,ro}(t)$, are canceled. These common errors may include timing errors and signal generation and transmission errors at the signal source 11, as well as other common errors. The signals $s_{A1,ro}(t)$ and $s_{A2,ro}(t)$ produced at the receiver output terminals are different from $s_{A1,a}(t)$ and $s_{A2,a}(t)$, respectively, as a result of (i) pre-processing of the received signals at the antennas, (ii) signal changes that occur during transport of the received signals, $s_{A1,a}(t)$ and $s_{A2,a}(t)$, to the respective receivers 17A1 and 17A2, (iii) signal changes that occur during processing of the received and transported signals at the respective receivers, and (iv) other distinguishing factors. Some of these distinguishing factors are approximately constant and independent of time, and other distinguishing factors will vary substantially with passage of time.

As measured at the receiver, a carrier phase observation includes additive effects of: (1) the true range $RP_m(t)$ between the location of the satellite (p) at the time the carrier phase signal was transmitted and the location of the receiver antenna (m) at the time the carrier phase signal is received; (2) an integer number of cycles $NP_m(t)$ (ignoring a fractional part f) corresponding to the distance between the satellite at transmission time and the receiver at the time t the signal is received; (3) satellite clock error $\Delta tP(t)$ at the time the carrier phase signal was transmitted; (4) receiver clock error $\Delta t_m(t)$ at the time the carrier phase signal is received; (5) phase advance $IP_m(t)$ introduced by propagation of the signal through the ionosphere (relative to propagation of the signal through a vacuum over the same distance); (6) phase retardation or delay $TP_m(t)$ introduced by propagation of the signal through the troposphere (relative to propagation of the signal through a vacuum over the same distance); (7) time delay $d_m(t)$ introduced in transmitting and processing the carrier phase signal after this signal is received at the receiver antenna (designated as receiver line bias, due to cable lengths, signal processing delays and the like; (8) time delay $dP(t)$ introduced in processing the carrier phase signal before this signal is transmitted by the satellite (designated as satellite line bias), due to cable lengths, signal processing delays and the like; and (9) a multipath signal contribution and random carrier phase measurement noise $eP_m(t)$ ("extraneous receiver error") at the receiver. The notation used here-is close to that adopted by A. Leick in *GPS Satellite Surveying*, John Wiley & Sons, Second Edition, 1995, pp. 255–264. The ionospheric time delay effect depends upon the carrier frequency f used by the satellite. The carrier phase observation $\phi P_m(t)$ is thus expressible by the relation $$\phi P_m(t)=RP_m(t)+\lambda NP_m(t)+c\Delta tP(t)-c\Delta t_m(t)-IP_m(t)+TP_m(t)+d_m(t)+dP(t)+eP_m(t). \quad (1)$$

where c is the velocity of light in a vacuum and $\lambda$ is the carrier wavelength. The phase difference $\phi P_m(t)=\phi_m(t)-\phi P(t)$ is usually developed for propagation in a vacuum, and terms, such as $IP_m(t)$ and $TP_m(t)$, are added to account for propagation in a medium other than a vacuum.

Where vehicle attitude or angular orientation parameters, such as yaw, pitch and/or roll of a land, waterborne, airborne or spaceborne vehicle, are to be determined, two or more spaced apart antennas are often located on the vehicle, and GPS signals are received and processed from the same group of satellites at each of these antennas. The baseline length between any two of these antennas is necessarily relatively small, usually no more than 100 meters and often as small as 1–2 meters.

In single difference carrier phase observations, carrier phase signals received at each of two spaced apart antennas are subtracted from each other to reduce or eliminate errors and other effects that are common to the phase observations measured at both receivers; these common errors include the satellite clock errors and satellite processing delays. A single difference phase observation is defined by the relations $$\phi P_{m,n}(t)=\phi P_m(t)-\phi P_n(t)=RP_{m,n}(t)+\lambda NP_{m,n}(t)-c\Delta t_{m,n}(t)+d_{m,n}(t)+eP_{m,n}(t), \quad (2)$$

$$RP_{m,n}(t)=RP_m(t)-RP_n(t), \quad (3)$$

$$NP_{m,n}(t)=NP_m(t)-NP_n(t), \quad (4)$$

$$\Delta t_{m,n}(t)=\Delta t_m(t)-\Delta t_n(t), \quad (5)$$

$$d_{m,n}(t)=d_m(t)-d_n(t), \quad (6)$$

$$eP_{m,n}(t)=eP_m(t)-eP_n(t). \quad (7)$$

The nearly common error due to ionospheric phase advance and the nearly common error due to tropospheric phase delay are dropped in Eq. (2), based on two arguments: (1) these phase advance or delay errors are nearly the same for two adjacent antennas, and thus they cancel when subtracted from each other; and (2) the ionospheric phase advance and tropospheric phase delay can be separately modeled and estimated for each receiver and the common satellite and thus can be separately removed from Eq. (2).

Conventional carrier phase analysis based on the single difference carrier phase observation in Eq. (1) requires determination or cancellation of the respective clock errors $\Delta t_m(t)$ and $\Delta t_n(t)$, which can be performed using clock measurements with an atomic clock, such as a Cs or Rb clock, or use of the same clock for both receivers. Determination of the receiver line biases $d_m(t)$ and $d_n(t)$ is not so straightforward, because each of the variables depends upon independent variables such as receiver cable lengths, method(s) of processing the signals received, receiver age, receiver component(s) bias and drift, local temperature and other imponderables.

"Line bias" in a two-antenna system is the difference of signal changes, due to different transport paths and different processing devices and/or methods, from the antennas to a point at which a difference of the two received signals is formed, called a single difference signal. A single difference observation SD(t;j;A1;A2) from a signal source j includes single difference observations at the two antennas, plus contributions from line bias, receiver noise and multipath signals. One problem here is to separate line bias from the remainder of a single difference observation.

Line biases can be canceled by using a second signal source and forming double differences for the two signal sources and the two receivers. However, the double difference approach sacrifices one measurement and increases the statistical error level (theoretically by a multiplicative factor of 1.414, assuming white noise is present) arising from multipath signals and receiver noise.

What is needed is a method and system for compensating for line biases without using a double difference method. The approach should be capable of quantitatively estimating variation of line bias around a well-defined initial line bias in approximately real time and should allow for changes in line bias variation with the passage of time.

SUMMARY OF THE INVENTION

These needs are met by the invention, which provides an approach that (1) creates a foreground task or higher priority thread, involving carrier phase single difference solutions, such as angular orientation and/or antenna locations, and (2) creates a background task or lower priority thread that quantitatively estimates line bias variations. The approach computes line bias variation using an optimal estimation method in the background tasks, provides smoothing of estimates of line bias variations with an appropriate low pass or integrating filter to reduce multipath signal errors and receiver noise, and compensates for, or updates, line bias values applied in the foreground task. These two tasks can also be implemented as two procedures in a single task or thread.

In certain time intervals, the line bias may have little or no variation and can be treated as substantially constant. In these time intervals, single difference solutions can be obtained in the foreground tasks without estimating line bias variation; the constant value of line bias is used. In this instance, the single difference solution will have fewer unknown variables to be estimated, and the results are more accurate. Background and foreground tasks are largely independent of each other, except that these tasks use the same carrier phase measurements, signal source information and some variables derived from this information, such as line-of-sight vector components and/or signal source locations. A line bias value in a foreground task is updated when the line bias variation computed in a corresponding background task becomes significant.

Two approaches are available for estimating line bias variation. In a first approach, Kalman filtering is used for multi-epoch optimal estimation. This method is appropriate when the dynamics of antenna array orientation angles or locations can be statistically modeled and the statistics of errors sources are well known. A second approach uses single epoch optimal estimation incorporating least squares optimization, which determines values of variables that best fit the observations.

The line bias variation estimates, which incorporate effects of carrier phase observation errors, are passed through one or more low pass or integrating filters, such as a Butterworth filter or a moving average filter. Rates of change of a line bias variation are expected to be much less than the rates of change of observation errors in most applications so that the smoothing improves the accuracy of estimation of line bias variations.

DESCRIPTION OF BEST MODES OF THE INVENTION

Figure 1:
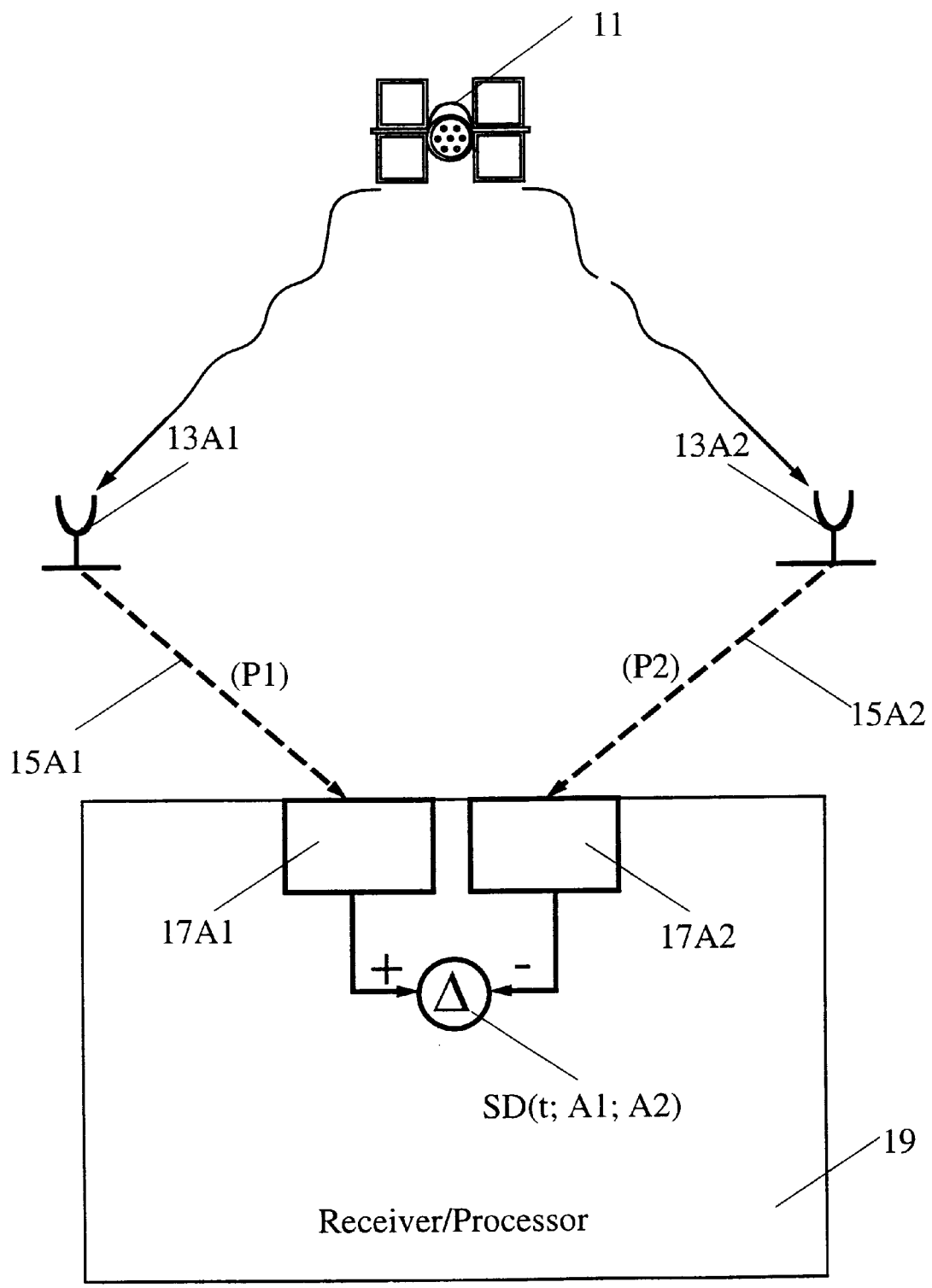
FIG. 1 illustrates an environment in which the invention can be used.
Figure 2:
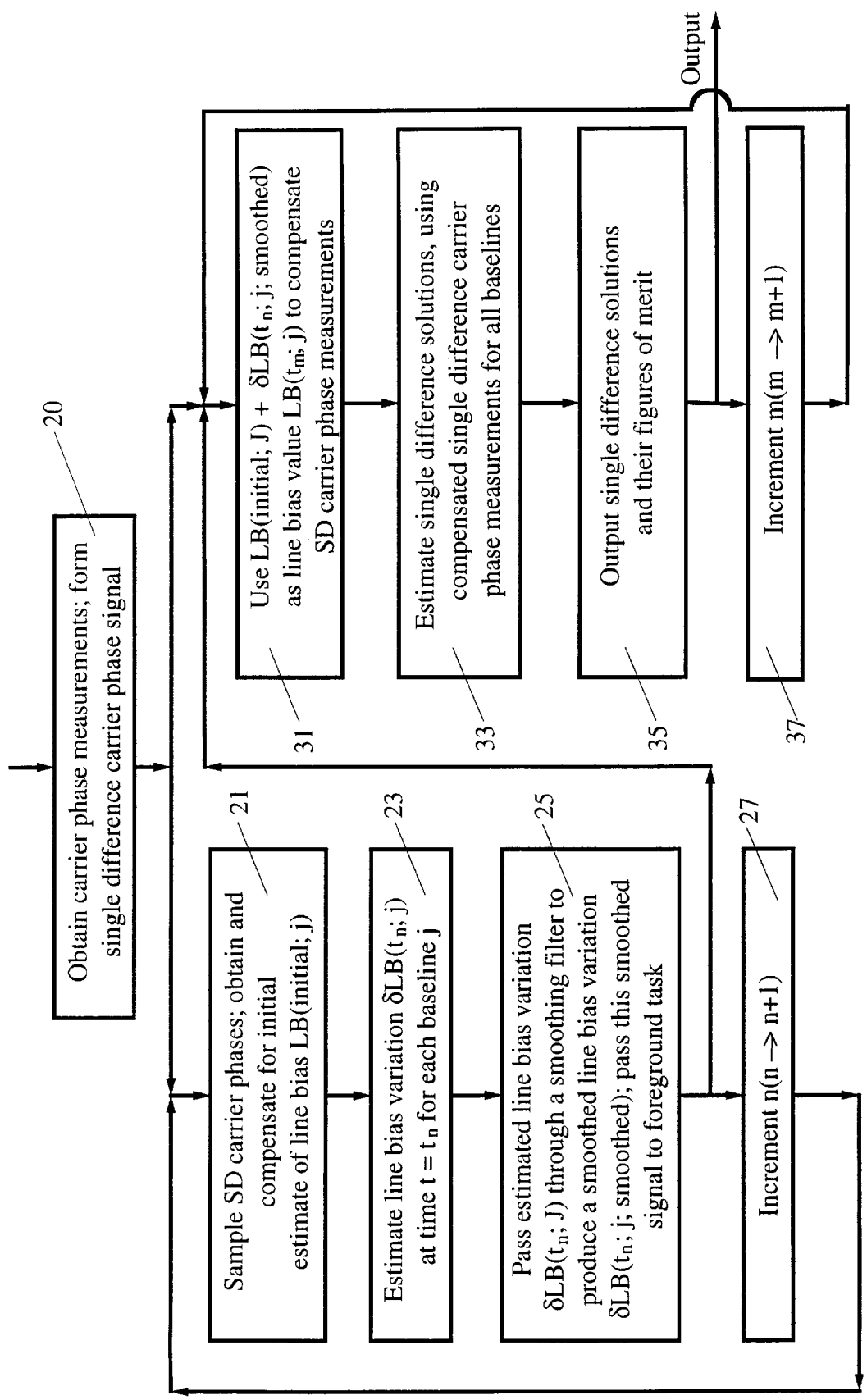
FIG. 2 is a flow chart illustrating a procedure for practicing the invention.

The flow chart in FIG. 2 illustrates a procedure for practicing the invention. In step 20, carrier phase variables, based on signals received from each of a plurality of GPS signal sources 11–j (j=1, 2,. . . , J; J≧2) at each of two or more antennas 13A1 and 13A2 (shown in FIG. 1), are measured and single difference signals $s_{SD,ro}$(t;j;A1;A2) are formed. In step 21, a suitable initial value LB(initial;j;A1;A2), optionally based on long-term observations, of line bias LB(t;j;A1;A2) is used. Single difference carrier phase observations are sampled and compensated for using the initial estimate LB(initial;j;A1;A2;) of line bias.

In step 23, a line bias variation $$\delta LB(t_n; j;A1;A2)=LB(t_n; j;A1;A2)-LB(\text{initial};j;A1;A2) \quad (8)$$

is estimated at each of a sequence $\{t_n\}_n$ of selected times with $t_{n+1}-t_n(>0)$ being a selected sequence of time increments that may be, but need not be, uniform.

In step 25, the line bias estimation values $\delta LB(t_n;j;A1;A2)$ (n variable, with j fixed) are passed through a selected smoothing filter, and a smoothed value of the line bias, $\delta LB(t_n;j;A1;A2;$ smoothed), is formed and passed to the beginning (step 31) of another processing sequence, a foreground task. The time index n is then incremented (n→n+1), in step 27, typically with an epoch length of 1–10 sec, and the system returns to step 21. Steps 21, 23, 25 and 27 are part of a "background" task of the system.

The smoothing filter used in step 25 may be a moving average filter, such as one defined by $$\delta LB(t_n; j; A1; A2; \text{smoothed}) = \sum_{k=0}^{K} w_k \delta LB(t_{n-k}; j; A1; A2), \quad (9)$$

where $\{w_k\}_k$ is a selected sequence of a non-negative weighting coefficients, preferably satisfying the constraint $$\sum_{k=0}^{K} w_k = 1, \quad (10)$$

and K is a selected non-negative integer. Alternatively, the smoothing filter may be a recursive filter with an abrupt decrease in filter value for (filtered) signal frequencies above a selected low pass cutoff frequency (e.g., a Butterworth filter), defined by $$\delta LB(t_n; j; A1; A2; \text{smoothed}) = \sum_{k=0}^{K} a'_k \delta LB(t_{n-k}; j; A1; A2), \quad (11)$$

$$- \sum_{k=1}^{K} a''_k \delta LB((t_{n-k}; A1; A2; \text{smoothed}),$$

where $\{a'_k\}_k$ and $\{a''_k\}_k$ are selected filter coefficient sequences.

In step 31, a smoothed line bias variation δLB ($t'_m$,j;A1;A2; smoothed) is used as a forward estimate for compensation of line bias variation for the carrier phase observations for a selected epoch ($t'_m \leq t < t'_{m+1}$). In step 33, single difference solutions, such as attitudes and/or attitude rates of change, are estimated using a least squares optimization method or other suitable algorithm and line bias-compensated single difference carrier phase signals received from all signal sources (j=1, . . . , J) at all antennas.

In step 35, estimates of single difference solutions (e.g., attitude and/or attitude rate of change) are provided as output quantities for the epoch with index m, along with figures of merit associated with these solutions. In step 37, the time index m is incremented (m→m+1), and the system returns to step 31. The time index indices n and m are incremented independently in steps 27 and 37. The steps 31, 33, 35 and 37 are part of a "foreground" task of the system.

In step 31, the system uses $$\delta LB(t;j;A1;A2;\text{est}) = \delta LB(t'_m;j;A1;A2;\text{smoothed}) \quad (t'_m \leq t < t'_{m+1}) \quad (12)$$

as an estimate of the line bias variation for a succeeding time interval $T_m = \{t | t'_m \leq t \leq t'_{m+1}\}$. In step 33, line bias-compensated single difference observations SD(t;j;A1;A2) for all antenna pairs A1 and A2 for the time interval $T_m$, are used to determine least squares optimal solutions for the unknown variables, such as attitudes and attitude rates of change, in the single difference equations, using line bias-compensated measurements from all the J selected carrier signal sources (j=1, . . . ,J).

Any of several least squares optimization procedures can be used in step 33. One useful and general least squares approach is set forth in "Attitude Determination Using GPS", Ph.D. dissertation submitted by Clark E. Cohen to the Department of Aeronautics and Astronautics, Stanford University, December 1992, pages 99–101. For example, if the desired solution concerns angular orientation of an array of GPS antennas, let $\Delta r_{ij}$ be a single difference measurement of distance from signal source number j to antenna baseline number i (i=1, . . . , I; j=1, . . . , J), let $b_i = (b_{i,1}, b_{i,2}, b_{i,3})$ be a baseline vector with known components in a body frame, let A be a 3×3 transformation matrix from a reference frame to body frame, let $s_j = (s_{j,1}, s_{j,2}, s_{j,3})$ be the line-of-sight vector from any antenna to GPS signal source number j, let $LB_i = LB(\text{initial};i) - \delta LB(t;i)$ be the line bias value for baseline i, and let $\{w_{ij}\}$ be a selected sequence of non-negative weighting coefficients. The functional to be minimized becomes $$F(A) = \sum_{i=1}^{I} \sum_{j=1}^{J} w_{ij} (\Delta r_{ij} - LB_i - b_i^T A s_j)^2. \quad (13)$$

Where interest centers on determination of three-dimensional angular orientation (attitude) of an antenna array, the unknown variables become components of a small angle rotation vector $\delta\theta = (\delta\theta1, \delta\theta2, \delta\theta3)$, referenced to a body frame coordinate system. The transformation A is then expressed as a matrix product of a (known) 3×3 transformation $A_0$ and a small angle rotation matrix, I+δΘ, where I is a 3×3 identity matrix and δΘ is a skew-symmetric matrix $$\delta\Theta = \begin{bmatrix} 0 & -\delta\theta3 & \delta\theta2 \\ \delta\theta3 & 0 & -\delta\theta1 \\ -\delta\theta2 & \delta\theta1 & 0 \end{bmatrix}. \quad (14)$$

Where interest centers on determination of location of an antenna, the unknown variables become translation vector components r=(x,y,z), relative to master antenna coordinates in a user-defined reference frame (e.g., in a WGS84 system). The functional to be minimized becomes $$F(r_i) = \sum_{j=1}^{J} w_{ij} (\Delta r_{ij} - LB_i - s_j^T r_i)^2 (i = 1, \ldots, I), \quad (15)$$

where $r_i = (x_i, y_i, z_i)$ is an estimate of the translation coordinate vector that minimizes the functional $F(r_i)$.

Figure 3A:
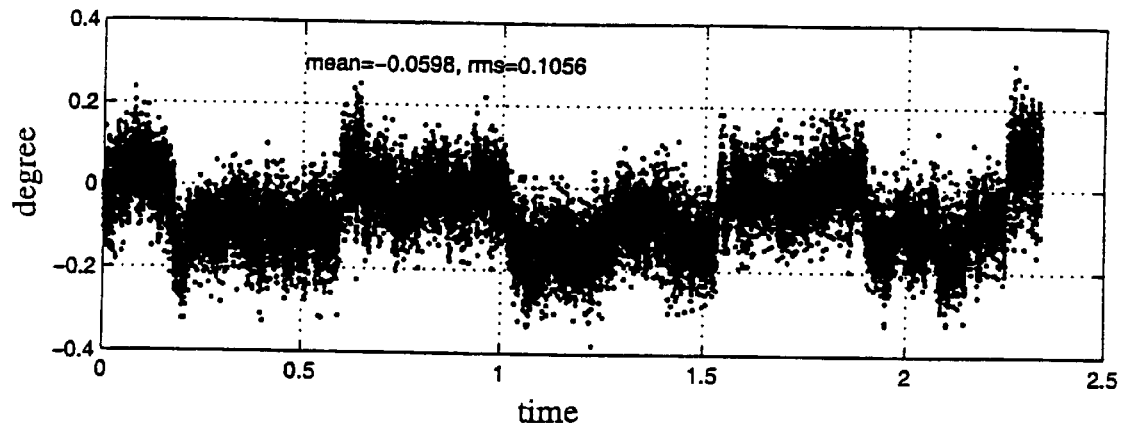
FIGS. 3A–3F are graphical views of estimated error in antenna roll, pitch and azimuth angle, before and after use of the invention.
Figure 3B:
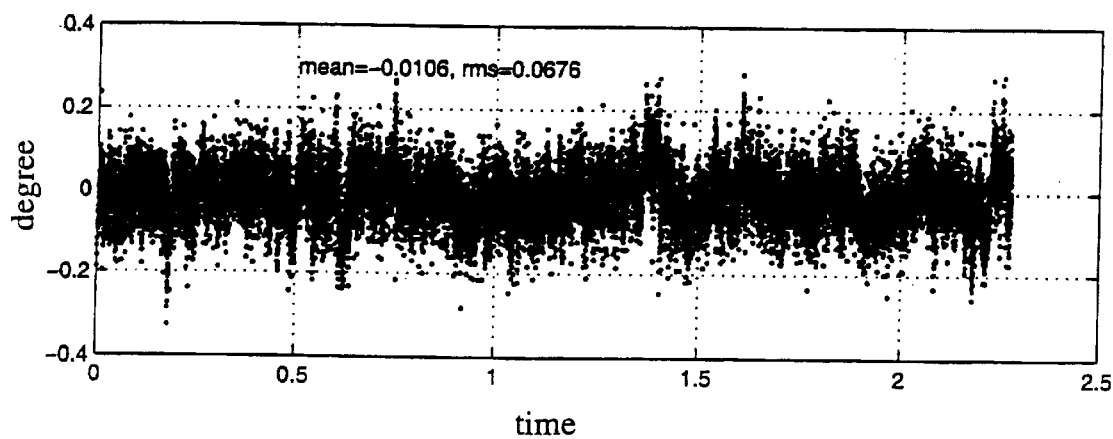

FIGS. 3A (before line bias compensation) and 3B (after line bias compensation) illustrate an improvement in roll error that occurs when the invention is applied to determination of roll angle (rotation about the y-axis) versus time (in units of $10^5$ sec) of an antenna array, from measurements made on GPS signals received at the antennas. FIG. 3A, centered around a mean value of about −0.06° and with an associated rms of 0.1056°0, presents roll angle offset or error where no corrections are incorporated. FIG. 3B, with a mean value of about −0.01° and a smaller associated rms of 0.0676°, presents roll angle offset or error after use of the invention with single difference processing.

Figure 3C:
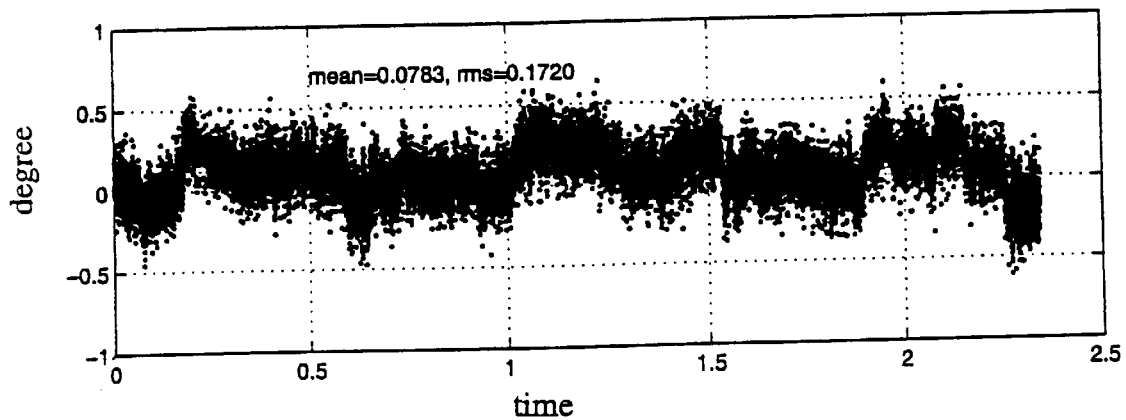
Figure 3D:
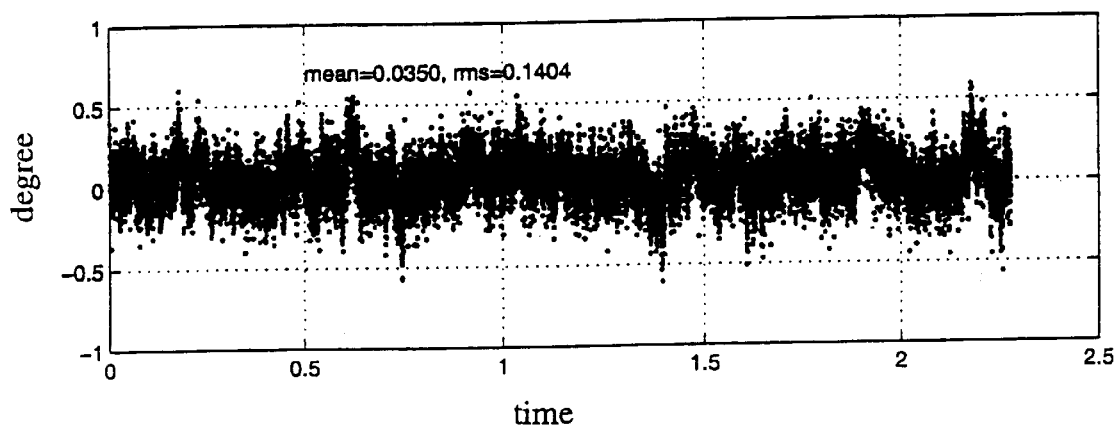

FIGS. 3C (before line bias compensation) and 3D (after line bias compensation) illustrate a similar improvement for pitch error (rotation about the x-axis) versus time (in units of $10^5$ sec) of an antenna array. FIG. 3C has an associated mean value of 0.0783° and an associated rms value of 0.1720°0. FIG. 3D has an associated mean value of 0.0350° and an associated rms value of 0.1404°.

Figure 3E:
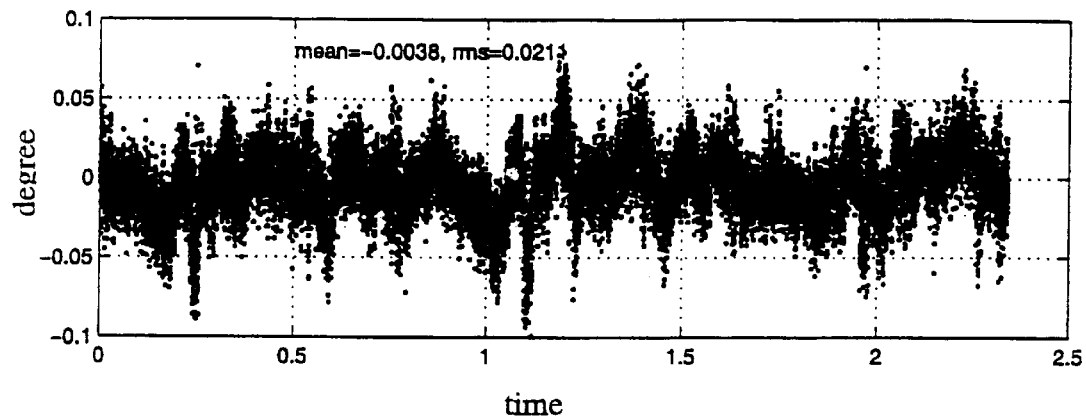
Figure 3F:
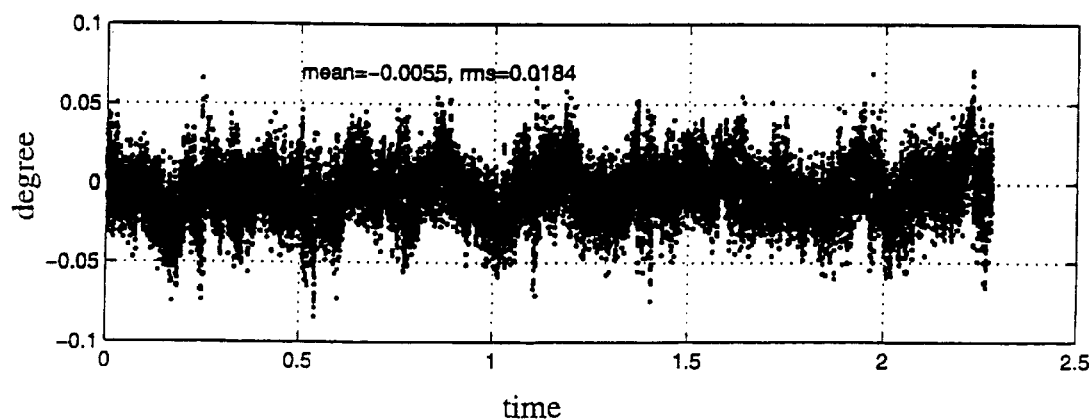

FIGS. 3E (before line bias compensation) and 3F (after line bias compensation) illustrate a similar improvement for yaw or azimuth error (rotation about the z-axis) versus time (in units of $10^5$ sec) of an antenna array. FIG. 3E has an associated mean value of −0.0038° and an associated rms value of 0.0211°. FIG. 3F has an associated mean value of −0.0055° and an associated rms value of 0.0184°.

The pairs of comparisons shown in FIGS. 3A–3F indicate the improvements in angular orientation errors that can be realized when compensation for line bias is separately provided.

Figure 4A:
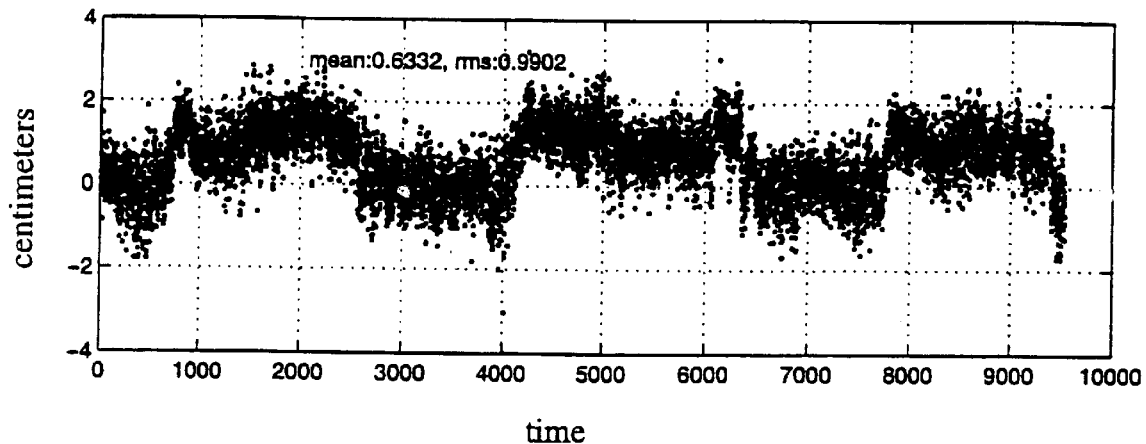
FIGS. 4A and 4B are graphical views of carrier phase residuals before and after use of the invention.
Figure 4B:
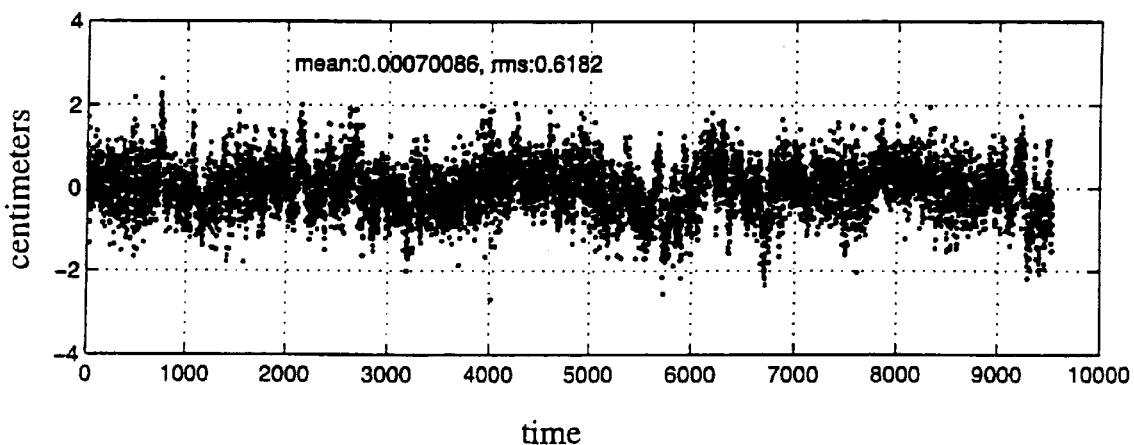

FIGS. 4A and 4B illustrate carrier phase residuals versus time (in units of 10 sec) before and after use of the invention, respectively, to compensate for line bias. Carrier phase residuals are observation errors, including uncompensated line bias, multipath errors and receiver noise. The trace in FIG. 4A has a mean value of 0.6332 cm and an rms value of 0.9902 cm. The trace in FIG. 4B has a mean value of 0.0007 cm and an rms value of 0.6182 cm, after line bias compensation. The improvement, especially in mean value, is substantial.

What is claimed is:

1. A method for estimating a line bias for a signal received from a common signal source at each of two or more signal receivers, the method comprising the steps of:

(i) receiving and measuring a signal from a carrier phase signal source at each of first and second signal-receiving stations, denoted station "A1" and station "A2", and forming a difference signal value LB($t_n$;A1;A2) from a first signal and a second signal received at the respective first and second stations from the carrier signal source;

(ii) providing an initial value for a line bias;

(iii) estimating a line bias variation that is a difference between the difference signal value and the initial line bias value for each of a sequence of at least two selected times t=$t_n$;

(iv) passing the estimated line bias variation values through a selected smoothing filter to produce a smoothed line bias variation;

(v) using a sum of the smoothed line bias variation and the initial line bias value to provide a forward estimate for line bias for at least one selected time interval $t_n \leq t < t_{n+1}$;

(vi) determining a least squares optimal solution for at least one unknown variable value in a single difference solution involving measurements of carrier phase signals from each of two or more carrier signal sources, compensated for line bias; and (vii) replacing the time index n by n+1 and repeating steps (i)–(vi) at least once.

2. The method of claim 1, wherein said step of determining said least squares optimal solution comprises the step of minimizing a functional $$F(A) = \sum_{i=1}^{I} \sum_{j=1}^{J} w_{ij}(\Delta r_{ij} - LB_i - b_i^T A s_j)^2,$$

with respect to choice of entries for a 3×3 transformation matrix A from a reference frame of coordinates to a body frame of coordinates, where $\Delta r_{ij}$ is a single differenced measurement of distance from signal source number j to antenna baseline number i (i=1, . . . , I; j=1, . . . , J), $b_i=(b_{i,1},b_{i,2},b_{i,3})$ is a baseline vector with known components in a body frame, $s_j=(s_{j,1},s_{j,2},s_{j,3})$ is a line-of-sight vector from a selected antenna baseline to a GPS signal source number j, $LB_i$ is said estimated line bias for antenna baseline number i, and $w_{ij}$ is a selected non-negative weighting coefficient.

3. The method of claim 1, wherein said step of determining said least squares optimal solution comprises the step of minimizing a functional $$F(r_i) = \sum_{j=1}^{J} w_{ij}(\Delta r_{ij} - LB_i - s_j^T r_i)^2 (i = 1, \ldots, I),$$

where $\Delta r_{ij}$ is a single differenced measurement of distance from signal source number j to antenna baseline number i (i=1, . . . , I; j=1, . . . , J),$s_j=(s_{j,1},s_{j,2},s_{j,3})$ is a line-of-sight vector from a selected antenna baseline to a GPS signal source number j, $r_i=(x_i,y_i,z_i)$ is an estimate of the translation coordinates of antenna baseline number i, $LB_i$ is said estimated line bias for antenna baseline number i, and $w_{ij}$ is a selected non-negative weighting coefficient.

4. A system for estimating a line bias for a signal received from a common signal source at each of two or more signal receivers, the system comprising:

a signal receiver, including a computer, where the computer is programmed:

(i) to receive and measures a signal from a carrier phase signal source at each of first and second signal-receiving stations, denoted station "A1" and station "A2", and to form a difference signal value LB($t_n$;A1;A2) from a first signal and a second signal received at the respective first and second stations from the carrier signal source;

(ii) to provide an initial value for a line bias;

(iii) to estimate a line bias variation that is a difference between the difference signal value and the initial line bias value for each of a sequence of at least two selected times t=$t_n$;

(iv) to pass the estimated line bias variation values through a selected smoothing filter to produce a smoothed line bias variation;

(v) to use a sum of the smoothed line bias variation and the initial line bias value to provide a forward estimate for line bias for at least one selected time interval $t_n \leq t < t_{n+1}$;

(vi) to determine a least squares optimal solution for at least one unknown variable value in a single difference solution involving measurements of carrier phase signals from each of two or more carrier signal sources, compensated for line bias; and (vii) to replace the time index n by n+1 and to repeat steps (i)–(vi) at least once.

5. The system of claim 4, wherein said computer is programmed to determine said least squares optimal solution by minimizing a functional $$F(A) = \sum_{i=1}^{I} \sum_{j=1}^{J} w_{ij}(\Delta r_{ij} - LB_i - b_i^T A s_j)^2,$$

with respect to choice of entries for a 3×3 transformation matrix A from a reference frame of coordinates to a body frame of coordinates, where $\Delta r_{ij}$ is a single differenced measurement of distance from signal source number j to antenna baseline number i (i=1, . . . I; j=1, . . . , J), $b_i=(b_{i,1},b_{i,2},b_{i,3})$ is a baseline vector with known components in a body frame, $s_j=(s_{j,1}, s_{j,2}, s_{j,3})$ is a line-of-sight vector from a selected antenna baseline to a GPS signal source number j, $LB_i$ is said estimated line bias for antenna baseline number i, and $w_{ij}$ is a selected non-negative weighting coefficient.

6. The system of claim 4, wherein said computer is programmed to determine said least squares optimal solution by minimizing a functional $$F(r_i) = \sum_{j=1}^{J} w_{ij}(\Delta r_{ij} - LB_i - s_j^T r_i)^2 (i = 1, \ldots, I),$$

where $\Delta r_{ij}$ is a single differenced measurement of distance from signal source number j to antenna baseline number i (i=1, . . . , I; j=1, . . . , J), $s_j=(s_{j,1},s_{j,2}, s_{j,3})$ is a line-of-sight vector from a selected antenna baseline to a GPS signal source number j,$r_i=(x_i,y_i,z_i)$ is an estimate of the translation coordinates of antenna baseline number i, $LB_i$ is said estimated line bias for antenna baseline number i, and $w_{ij}$ is a selected non-negative weighting coefficient.

7. A method for estimating a line bias for a signal received from a common signal source at each of two or more signal receivers, the method comprising the steps of:

(i) receiving and measuring a signal from a carrier phase signal source number j (j=1, . . . , J; J≧2) at each of first and second signal-receiving stations, denoted station "A1" and station "A2", and forming a difference signal value LB(t;A1;A2;j) between a first signal and a second signal received at the respective first and second stations;

(ii) obtaining an initial value LB(initial;A1;A2;j) for line bias; (iii) estimating a line variation δLB(t$_n$;A1;A2;j)= LB(t$_n$;A1;A2;j)−LB(initial;A1;A2;j) for each of a sequence of at least two selected times t=t$_n$;

(iv) passing the estimated line bias variation δLB (t$_n$;A1;A2;j) through a selected smoothing filter to produce a smoothed line bias variation δLB (t$_n$;A1;A2;j;smoothed);

(v) using the smoothed variation δLB(t$_n$;A1;A2;j; smoothed) in a forward estimate of line bias, LB(t;j;smoothed)=δLB(t;A1;A2;j;smoothed)+LB (initial;j), for at least one selected time interval t$_n$≦t<t$_{n+1}$;

(vi) determining a least squares optimal solution for at least one unknown variable value in a single difference solution involving measurements of carrier phase signal from all sources j=1, . . . ,J, compensated for estimated line bias; and (vii) replacing the time index n by n+1 and repeating steps (i)–(vi) at least once.

8. The method of claim 7, wherein said step of determining said least squares optimal solution comprises the step of minimizing a functional $$F(A) = \sum_{i=1}^{I} \sum_{j=1}^{J} w_{ij}(\Delta r_{ij} - LB_i - b_i^T A s_j)^2,$$

with respect to choice of entries for a 3×3 transformation matrix A from a reference frame of coordinates to a body frame of coordinates, where Δr$_{ij}$ is a single differenced measurement of distance from signal source number j to antenna baseline number i (i=1, . . . , I; j=1, . . . , J), b$_i$=(b$_{i,1}$,b$_{i,2}$,b$_{i,3}$) is a baseline vector with known components in a body frame, s$_j$=(s$_{j,1}$, s$_{j,2}$, s$_{j,3}$) is a line-of-sight vector from a selected antenna baseline to a GPS signal source number j, LB$_i$ is said estimated line bias for antenna baseline number i, and w$_{ij}$ is a selected non-negative weighting coefficient.

9. The method of claim 7, wherein said step of determining said least squares optimal solution comprises the step of minimizing a functional $$F(r_i) = \sum_{j=1}^{J} w_{ij}(\Delta r_{ij} - LB_i - s_j^T r_i)^2 (i = 1, \ldots, I),$$

where Δr$_{ij}$ is a single differenced measurement of distance from signal source number j to antenna baseline number i (i=1, . . . , I; j=1, . . . , J), s$_j$=(s$_{j,1}$,s$_{j,2}$, s$_{j,3}$) is a line-of-sight vector from a selected antenna baseline to a GPS signal source number j, r$_i$=(x$_i$,y$_i$,z$_i$) is an estimate of the translation coordinates of antenna baseline number i, LB$_i$ is said estimated line bias for antenna baseline number i, and w$_{ij}$ is a selected non-negative weighting coefficient.

10. A system for estimating a line bias for a signal received from a common signal source at each of two or more signal receivers, the system comprising:

a signal receiver, including a computer, where the computer is programmed:

(i) to receive and measures a signal from a carrier phase signal source number j (j=1, . . . ,J: J≧2) at each of first and second signal-receiving stations, denoted station "A1" and station "A2", and to form a difference signal value LB(t;A1;A2;j) between a first signal and a second signal received at the respective first and second stations from the carrier signal source;

(ii) to provide an initial value LB(initial;j) for a line bias;

(iii) to estimate a line variation δLB(t$_n$;A1;A2;j)=LB (t$_n$;A1;A2;j)−LB(initial;A1;A2;j) for each of a sequence of at least two selected times t=t$_n$;

(iv) to pass the estimated line bias variation δLB (t$_n$;A1;A2;j) through a selected smoothing filter to produce a smoothed line bias variation δLB (t$_n$;A1;A2,j;smoothed);

(v) to use the smoothed variation δLB(t$_n$;A1;A2;j; smoothed) in a forward estimate of line bias, LB(t;j;smoothed)=δLB(t;A1;A2;j;smoothed)+LB (initial;j), for at least one selected time interval t$_n$≦t<t$_{n+1}$;

(vi) to determine a least squares optimal solution for at least one unknown variable value in a single difference solution involving measurements of carrier phase signal from all sources j=1, . . . , J, compensated for estimated line bias; and (vii) to replace the time index n by n+1 and repeating steps (i)–(vi) at least once.

11. The system of claim 10, wherein said computer is programmed to determine said least squares optimal solution by minimizing a functional $$F(A) = \sum_{i=1}^{I} \sum_{j=1}^{J} w_{ij}(\Delta r_{ij} - LB_i - b_i^T A s_j)^2,$$

with respect to choice of entries for a 3×3 transformation matrix A from a reference frame of coordinates to a body frame of coordinates, where Δr$_{ij}$ is a single differenced measurement of distance from signal source number j to antenna baseline number i (i=1, . . . , I; j=1, . . . , J), b$_i$=(b$_{i,1}$,b$_{i,2}$,b$_{i,3}$) is a baseline vector with known components in a body frame, s$_j$=(s$_{j,1}$,s$_{j,2}$, s$_{j,3}$) is a line-of-sight vector from a selected antenna baseline to a GPS signal source number j, LB$_i$ is said estimated line bias for antenna baseline number i, and w$_{ij}$ is a selected non-negative weighting coefficient.

12. The system of claim 10, wherein said computer is programmed to determine said least squares optimal solution by minimizing a functional $$F(r_i) = \sum_{j=1}^{J} w_{ij}(\Delta r_{ij} - LB_i - s_j^T r_i)^2 (i = 1, \ldots, I),$$

where Δr$_{ij}$ is a single differenced measurement of distance from signal source number j to antenna baseline number i (i=1, . . . , I; j=1, . . . , J), s$_j$=(s$_{j,1}$,s$_{j,2}$,s$_{j,3}$) is a line-of-sight vector from a selected antenna baseline to a GPS signal source number j, r$_i$=(x$_i$,y$_i$,z$_i$) is an estimate of the translation coordinates for antenna baseline number i, LB$_i$ is said estimated line bias for antenna baseline number i, and w$_{ij}$ is a selected non-negative weighting coefficient.

* * * * *